(12) United States Patent
Khait et al.

(10) Patent No.: US 11,393,049 B2
(45) Date of Patent: Jul. 19, 2022

(54) MACHINE LEARNING MODELS FOR SELECTING TREATMENTS FOR TREATING AN AGRICULTURAL FIELD

(71) Applicant: Centure Applications LTD, Tel-Aviv (IL)

(72) Inventors: Itzhak Khait, Kibutz Ein Zivan (IL); Alon Klein Orbach, Tel-Aviv (IL); Yoav Halevi, Tel Aviv (IL)

(73) Assignee: Centure Applications LTD, Tel-Aviv (IL)

( * ) Notice: Subject to any disclaimer, the term of this patent is extended or adjusted under 35 U.S.C. 154(b) by 0 days.

(21) Appl. No.: 17/313,183

(22) Filed: May 6, 2021

(65) Prior Publication Data

US 2022/0092705 A1 Mar. 24, 2022

Related U.S. Application Data

(60) Provisional application No. 63/082,500, filed on Sep. 24, 2020, provisional application No. 63/149,378, filed on Feb. 15, 2021.

(51) Int. Cl.
*G06Q 50/02* (2012.01)
*G06N 20/00* (2019.01)
(Continued)

(52) U.S. Cl.
CPC ............. *G06Q 50/02* (2013.01); *A01G 7/04* (2013.01); *G06N 20/00* (2019.01); *G06V 20/188* (2022.01)

(58) Field of Classification Search
CPC .... G06Q 50/02; G06N 20/00; G06K 9/00657; A01G 7/04
(Continued)

(56) References Cited

U.S. PATENT DOCUMENTS 9,148,995 B2 10/2015 Hmicek et al.
10,255,670 B1 * 4/2019 Wu .................... H04N 7/183
(Continued)

FOREIGN PATENT DOCUMENTS

WO WO 2020/049576 3/2020

OTHER PUBLICATIONS

Booker "Technology Targets Spray Control", WEEDit, Blog, 4 P., Mar. 22, 2018.
(Continued)

*Primary Examiner* — Michael R Neff

(57) ABSTRACT

There is provided a system for customized application of herbicides, comprising: a processor(s) executing a code for: feeding test images corresponding to a target agricultural field into a machine learning model trained on a training dataset of sample images of sample agricultural field(s) labelled with ground truth of weed parameters, selecting specific weed parameter(s) of according to performance metric(s) of the model, setting up instructions for triggering application of a first herbicide to a portion of the target agricultural field in response to an outcome of the model indicating likelihood of the specific weed parameter(s) being depicted in an input image of the portion of the target agricultural field, and setting up instructions for triggering application of a second herbicide to the portion of the target agricultural field in response to the outcome of the model indicating non-likelihood of the specific weed parameter(s) being depicted in the input image.

20 Claims, 7 Drawing Sheets

(51) Int. Cl.
*A01G 7/04* (2006.01)
*G06V 20/10* (2022.01)

(58) Field of Classification Search
USPC .............................................................. 702/2
See application file for complete search history.

(56) References Cited

U.S. PATENT DOCUMENTS

| | | |
|---|---|---|
| 2012/0237083 A1 | 9/2012 | Lange et al. |
| 2018/0330166 A1 | 11/2018 | Redden et al. |
| 2019/0064363 A1 | 2/2019 | Redden et al. |
| 2019/0124827 A1* | 5/2019 | Davis .................... B05B 12/004 |
| 2019/0239502 A1 | 8/2019 | Palomares et al. |
| 2020/0011019 A1* | 1/2020 | Serrat ................... G06T 7/0002 |
| 2020/0214281 A1* | 7/2020 | Koch ........................ G06T 7/70 |

OTHER PUBLICATIONS

Klein et al. "Nozzles—Selection and Sizing", Cooperative Extension, Institute of Agriculture and Natural Resources, University of Nebraska—Lincoln, EC141, p. 1-10, 2011.
Wolf "Optical Spot Sparying and AI Scouting", Sprayers 101, 12 P., Feb. 8, 2019.
International Search Report and the Written Opinion dated Dec. 22, 2021 From the International Searching Authority Re. Application No. PCT/IL2021/051133 (24 Pages).

\* cited by examiner

MACHINE LEARNING MODELS FOR SELECTING TREATMENTS FOR TREATING AN AGRICULTURAL FIELD

RELATED APPLICATIONS

This application claims the benefit of priority under 35 USC § 119(e) of U.S. Provisional Patent Application Nos. 63/082,500 filed on Sep. 24, 2020, and 63/149,378 filed on Feb. 15, 2021. The contents of the above applications are all incorporated by reference as if fully set forth herein in their entirety.

FIELD AND BACKGROUND OF THE INVENTION

The present invention, in some embodiments thereof, relates to agricultural treatment of weeds, and, more specifically, but not exclusively, to machine learning models for selecting herbicides for application to an agricultural field.

Standard approaches use spray booms to broadly apply a broad herbicide to an entire agricultural field.

SUMMARY OF THE INVENTION

According to a first aspect, a system for customizing a computing device for dynamic application of herbicides to a target agricultural field, comprises: at least one hardware processor executing a code for: feeding a plurality of test images corresponding to the target agricultural field into a machine learning model trained on a training dataset of a plurality of sample images of at least one sample agricultural field labelled with ground truth of a plurality of weed parameters, selecting at least one specific weed parameter of the plurality of weed parameters according to at least one performance metric of the machine learning model, setting up instructions for triggering application of a first herbicide to a portion of the target agricultural field in response to an outcome of the machine learning model indicating likelihood of the at least one specific weed parameter being depicted in an input image of the portion of the target agricultural field, and setting up instructions for triggering application of a second herbicide to the portion of the target agricultural field in response to the outcome of the machine learning model indicating non-likelihood of the at least one specific weed parameter being depicted in the input image.

According to a second aspect, a method for customizing a computing device for dynamic application of herbicides to a target agricultural field, comprises: feeding a plurality of test images corresponding to the target agricultural field into a machine learning model trained on a training dataset of a plurality of sample images of at least one agricultural field labelled with ground truth of a plurality of weed types, selecting at least one specific weed type of the plurality of weed types according to at least one performance metric of the machine learning model, setting up instructions for triggering application of a specific herbicide to a portion of the target agricultural field in response to an outcome of the machine learning model indicating likelihood of the at least one specific weed type being depicted in an input image of the portion of the target agricultural field, and setting up instructions for triggering application of a non-specific herbicide to the portion of the target agricultural field in response to the outcome of the machine learning model indicating non-likelihood of the at least one specific weed type being depicted in the input image.

According to a third aspect, a system for customized dynamic application of herbicides to a target agricultural field, comprises: at least one hardware processor executing a code for: in a plurality of iterations, while maneuvering over a plurality of portions of the target agricultural field, for each respective portion of the target agricultural field: accessing a respective input image depicting the respective portion of the target agricultural field, the respective input image captured by an imaging sensor located on an agricultural machine, feeding the respective input image into a machine learning model, analyzing an outcome of the machine learning model to determine likelihood of at least one specific weed parameter being depicted in the respective input image, in response to the at least one specific weed parameter likely being depicted in the respective input image, instructing application of a first herbicide to the respective portion of the target agricultural field depicted in the input image, and in response to the at least one specific weed parameter non-likely being depicted in the respective input image, instructing application of a second herbicide to the respective portion of the target agricultural field depicted in the input image, wherein the at least one specific weed parameter is selected from a plurality of weed parameters according to at least one performance metric of the machine learning model fed a plurality of test images corresponding to the target agricultural field into a machine learning model trained on a training dataset of a plurality of sample images of at least one sample agricultural field labelled with ground truth of a plurality of weed parameters.

In a further implementation form of the first, second, and third aspects, the plurality of weed parameters are selected from a group consisting of: weed species, and growth stage.

In a further implementation form of the first, second, and third aspects, the training dataset includes the plurality of sample images of the at least one agricultural field further labelled with ground truth of a plurality of field parameters of the corresponding sample agricultural field, and the plurality of test images are fed into the machine learning model with at least one field parameter of the target agricultural field.

In a further implementation form of the first, second, and third aspects, the plurality of field parameters are selected from a group consisting of: geographical location, season, phase during an agricultural growth cycle, soil type, whether soil is tilled, whether soil is untilled, weather, and desired crop being grown.

In a further implementation form of the first, second, and third aspects, the at least one hardware processor further executes a code for: in a plurality of iterations, while maneuvering over a plurality of portions of the target agricultural field, for each respective portion of the target agricultural field: accessing a respective input image depicting the respective portion of the target agricultural field, the respective input image captured by an imaging sensor located on an agricultural machine, feeding the respective input image into the machine learning model, analyzing an outcome of the machine learning model to determine likelihood of the at least one specific weed parameter being depicted in the respective input image, in response to the at least one specific weed parameter likely being depicted in the respective input image, instructing application of the first herbicide to the respective portion of the target agricultural field depicted in the input image, and in response to the at least one specific weed parameter non-likely being depicted in the respective input image, instructing application of the second herbicide to the respective portion of the target agricultural field depicted in the input image.

In a further implementation form of the first, second, and third aspects, the agricultural machine is connected to a spray boom, wherein at least one treatment application element for application of the first herbicide and the second herbicide and, the imaging sensor are connected to the spray boom.

In a further implementation form of the first, second, and third aspects, the second herbicide is a broad herbicide selected for treating weeds having a subset of the plurality of weed parameters that exclude the at least one specific weed parameter.

In a further implementation form of the first, second, and third aspects, the first herbicide comprises a specific herbicide selected for treating weeds having the at least one specific weed parameter.

In a further implementation form of the first, second, and third aspects, the test images are captured by an imaging sensor at a resolution corresponding to a target resolution of a target imaging sensor that captures the input image.

In a further implementation form of the first, second, and third aspects, selecting comprises at least one specific weed parameter of the plurality of weed parameters when an accuracy of classification of the machine learning model for at least one certain weed parameter is above a threshold.

In a further implementation form of the first, second, and third aspects, a set of weed parameters of the plurality of weed parameters are designated as non-specific weed parameters when the accuracy of classification of the machine learning model is below the threshold.

In a further implementation form of the first, second, and third aspects, the specific weed parameter and the non-specific weed parameter are of a same species of weed of different sizes during different growth stages, wherein test images depict same weed species of various sizes and/or various growth stages, wherein the threshold is set to differentiate between weeds depicted in input images that are of growth stages above a size threshold and weeds depicted in the image that are of other growth stages below the size threshold.

In a further implementation form of the first, second, and third aspects, the machine learning model comprises a detector component, wherein the test images depict weeds that are of various visual similarities to a ground, the threshold is set to differentiate detection of weeds depicted in the input image that are visually non-similar to the ground and weeds depicted in the input image that are visually similar to the ground.

In a further implementation form of the first, second, and third aspects, the machine learning model comprises a classifier component, wherein the test images depict weeds that are of various visual similarities to a desired crop, the threshold is set to differentiate classification of weeds that are visually similar to the desired crop from weeds that are visually non-similar to the desired crop.

In a further implementation form of the first, second, and third aspects, setting up instructions for triggering application of the first herbicide comprises setting up instructions for triggering application of the first herbicide using a spot treatment application element designed to apply treatment to a specific spot depicted in the input image, and setting up instructions for triggering application of the second herbicide comprises setting up instructions for triggering application of the second herbicide using a broadcast treatment application element designed to apply treatment using a broadcast approach to a broad region.

In a further implementation form of the first, second, and third aspects, the first herbicide and the second herbicide are liquid chemicals stored in respective containers on an agricultural machine that includes treatment application elements for application to the target agricultural field.

In a further implementation form of the first, second, and third aspects, the second herbicide is further designed to treat weeds having weed parameters of a plurality of species of weeds prior to sprouting from the ground, and/or small weeds less than a size threshold.

In a further implementation form of the first, second, and third aspects, the machine learning model comprises a detector component that generates an outcome of boxes in response to the input image, each box representing a respective weed having at least one weed parameter depicted therein, the detector component trained on a training dataset of sample images labelled with ground truth sample boxes each depicting a sample weed having at least one weed parameter therein.

In a further implementation form of the first, second, and third aspects, the machine learning model comprises a classifier component that generates an outcome of probability of the at least one weed parameter being depicted in the image, the classifier component trained on a training dataset of sample images tagged with a ground truth label indicating presence or absence of sample weeds having weed parameters depicted therein.

In a further implementation form of the first, second, and third aspects, the machine learning model is implemented as: a detector component trained on a training dataset of images annotated with ground truth boundaries indicating respective objects associated with respective weed parameters, is fed an input image, for generating an outcome of a plurality of bounding boxes, each respective bounding box is associated with a respective first probability value indicating likelihood of a respective weed parameter(s) being depicted in the respective box, for a first subset of bounding boxes associated with the respective first probability values less than a first threshold, respective patches corresponding to the subset are extracted from the image, wherein a second subset of bounding boxes are associated with respective first probability values greater than the first threshold, the extracted respective patches are fed into a classifier component trained on a training dataset of patches extracted from images labelled with ground truth labels indicating respective weed parameters, for obtaining a second probability value indicating likelihood of a respective weed parameter(s) being depicted in the respective patch, selecting a third subset of bounding boxes from the first subset according to respective second probability value greater than the first threshold, clustering the second subset and the third subset according to respective weed parameter(s), and computing a respective third probability value for each weed parameter of each cluster, wherein the respective third probability denoted likelihood of the at least one specific weed parameter being depicted in an input image of the portion of the target agricultural field used to trigger the instructions for application of the first herbicide or the second herbicide.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF SPECIFIC EMBODIMENTS OF THE INVENTION

Figure 1:
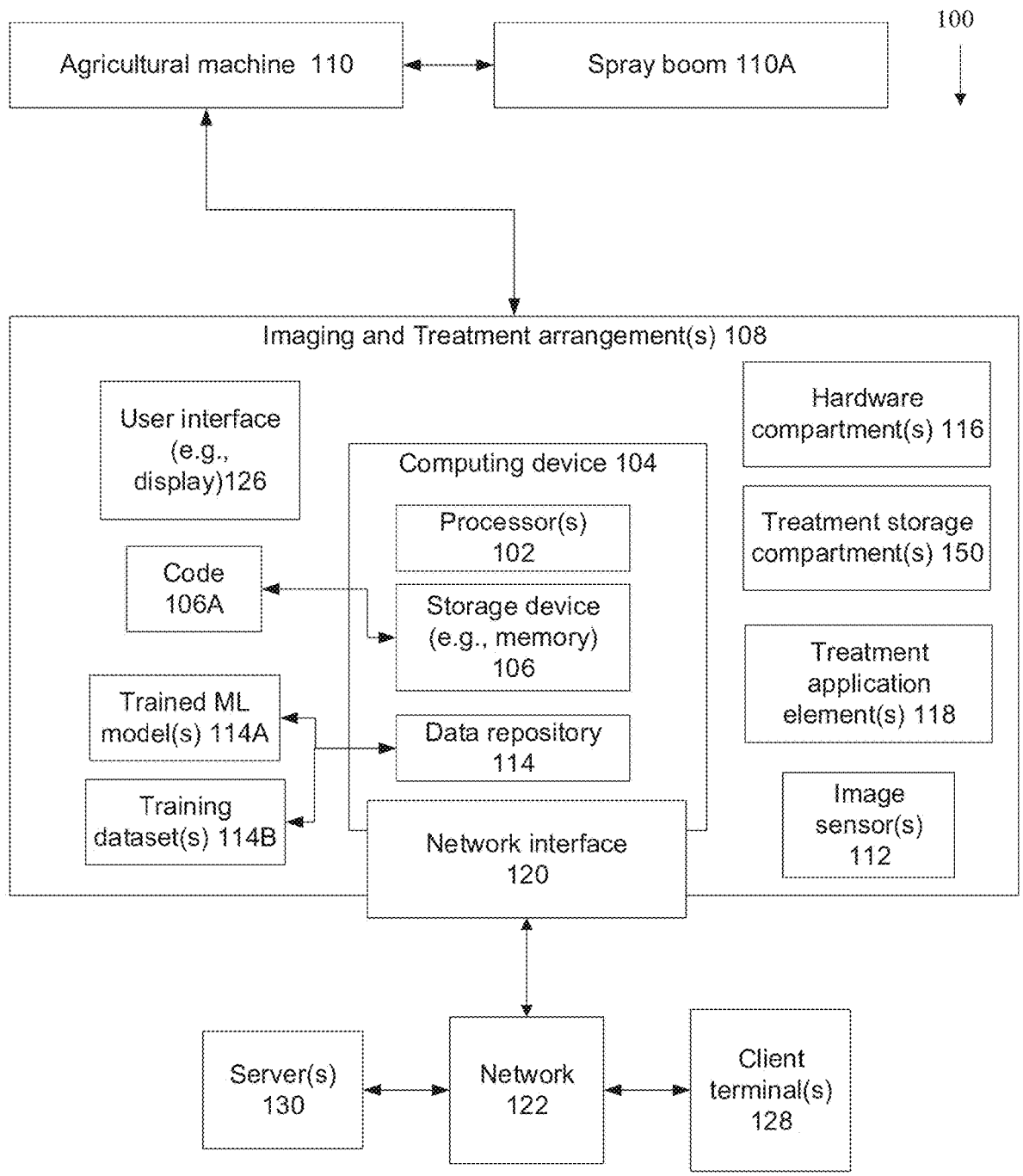
FIG. 1 is a schematic of a block diagram of a system for customizing a computing device for dynamic application of herbicides to a target agricultural field and/or for using computing device for dynamic application of herbicides to the target agricultural field, in accordance with some embodiments of the present invention.

The present invention, in some embodiments thereof, relates to agricultural treatment of weeds, and, more specifically, but not exclusively, to machine learning models for selecting herbicides for application to an agricultural field.

As used herein, the selection of the herbicide to apply to a portion of a target agricultural field depicted in an input image is provided as a not necessarily limiting example. It is to be understood that other types of treatments may be used instead of, and/or in addition to, to herbicides, for example, the outcome of the machine learning model may be analyzed to set up application of other treatments, such as fertilizer, pesticide, water, fungicide, insecticide, growth regulator, and the like. For example, the images depict growths at different growth parameters, the training images used to train the machine learning model include images depicting growths labelled with a ground truth of different growth parameters, and the outcome of the performance metric(s) is for detection and/or classification of input images for different growth parameters. The setting up is for application of one or more treatments according to the performance metrics.

An aspect of some embodiments of the present invention relates to systems, methods, an apparatus, and/or code instructions (e.g., stored on a memory and implementable by processors) for customizing a computing device for dynamic application of herbicides to a target agricultural field. Test images corresponding to a target agricultural field are fed into a machine learning model. The machine learning model is trained on a training dataset of sample images of sample agricultural fields labelled with a ground truth of weed parameters of weeds depicted therein, for example, weed species and/or growth stages of the weeds. The test images are of sample fields having sample field parameters corresponding to the target field parameters of the target agriculture field, for example, geographical location, season, phase during an agricultural growth cycle, soil type, whether soil is tilled, whether soil is untilled, weather, and desired crop being grown. Specific weed parameter(s) are selected according to performance metric(s) of the machine learning model, for example, accuracy of detection of the weed parameter(s) in the test images above a threshold. Instructions are set up for triggering application of a first herbicide to the portion of the agricultural field in response to an outcome of the machine learning model indicating likelihood of the specific weed parameter being depicted in an input image of the portion of the target agricultural field. For example, application of a specific herbicide designed to kill a specific weed species and/or to kill weeds at specific growth stages. The first herbicide may be applied using spot treatment elements that apply treatment to a certain spot. Additional instructions (e.g., default) may be set up for triggering application of a second herbicide to the portion of the target agricultural field in response to the outcome of the machine learning model indicating non-likelihood of the at least one specific weed parameter being depicted in the input image. For example, application of a broad herbicide designed to kill many different weed species and/or kill weeds at different growth stages. The second herbicide may be applied using broad treatment elements that apply treatment to a broad region. It is noted that three or more different herbicides may be applied, for example, instructions may be set up per week parameter or for different combinations of weed parameters.

In use, the following features are performed while an agricultural machine (e.g., spray boom, tractor), on which are installed the treatment elements and/or image sensors, maneuvers over portions of the target agricultural field; Respective images captured by respective image sensors, each depicting a different portion of the target agricultural field, are fed into the machine learning model, for obtaining an outcome, optionally probability of the specific weed parameter(s) being depicted in the respective input image. The outcome is analyzed, for example, compared to a threshold. In response to the specific weed parameter(s) likely being depicted in the respective input image, for example when the probability is above the threshold, application of the first herbicide to the respective portion of the target agricultural field depicted in the input image is instructed. In response to the specific weed parameter(s) non-likely being depicted in the respective input image, for example when the probability is below the threshold, application of the second herbicide to the respective portion of the target agricultural field depicted in the input image is instructed. Alternatively, the application of the second herbicide is a default which is executed when the condition of the first herbicide is not met.

At least some implementations of the systems, methods, apparatus, and/or code instructions described herein address the technical problem of improving application of a treatment to an agricultural field by treatment application elements located on an agricultural machine. At least some implementations of the systems, methods, apparatus, and/or code instructions described herein improve the technical field of agricultural treatment. The treatment may be, for example, one or more of: herbicide, pesticide, and/or fertilizer. Traditionally, agricultural fields are uniformly treated by applying a treatment to the entire field, for example, booms attached to tractors and/or airplanes that spray the entire field approximately uniformly with herbicides to prevent growth of weeds. There are one or technical problems with application for agricultural treatment. First, the same agricultural treatment may not be effective against different types of growths (e.g., weeds). Traditionally, the problem has been addressed by using a mix of multiple different chemicals, which raises other problems, as discussed. Second, using large amounts of chemicals (e.g., generic, mixes, growth specific targeted) creates growths (e.g., weeds) resistant to the chemicals. Third, applying generic and/or mixes of chemicals and/or growth type specific chemicals to the entire field is inefficient use of the chemicals, which increases utilization of the agricultural machine and/or increase costs. Fourth, applying large amounts of chemicals and/or applying chemicals to the entire field creates excessive adverse environmental impacts.

At least some implementations of the systems, methods, apparatus, and/or code instructions described herein address the above mentioned technical problem, and/or improve the above mentioned technology, by using trained machine learning models to analyze images of the agricultural fields. A respective treatment is selected per agricultural region depicted in the image according to the analysis. When the trained machine learning model is determined to accurately identify the growth in the image, a specific treatment may be selected for spot treatment of the growth. The growth may be accurately determined, for example, for large and/or developed undesired growths (e.g., weeds), for large and/or developed desired growths (e.g., crops). The specific treatment may be designed for the identified type of growth, for example, specific types of weeds resistant to certain chemicals. In some cases, the trained machine learning model is unable to accurately identify the growth (e.g., weed) in the image, for example, growths that have not yet sprouted above ground, growths that are small and/or in early stages (e.g., due to lack of resolution), growths that are similar to the background of the ground of the agricultural field, and/or undesired growths (e.g., weeds) that are visually similar to desired growths (e.g., crops). When the trained machine learning model is unable to accurately identify the growth in the image, another treatment, such as a broad treatment and/or a mix of treatments may be selected from broad treatment of the region depicted in the image.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
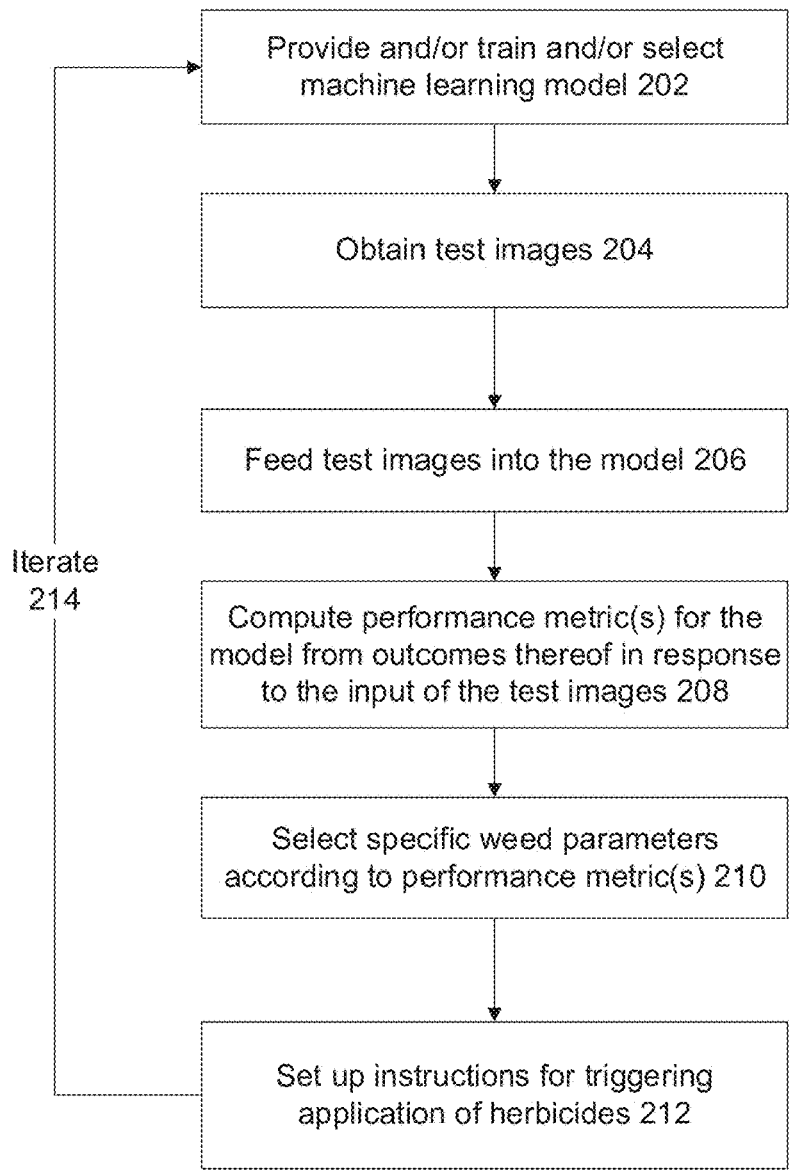
FIG. 2 is a flowchart of a method of customizing dynamic application of herbicides to a target agricultural field, in accordance with some embodiments of the present invention.
Figure 3:
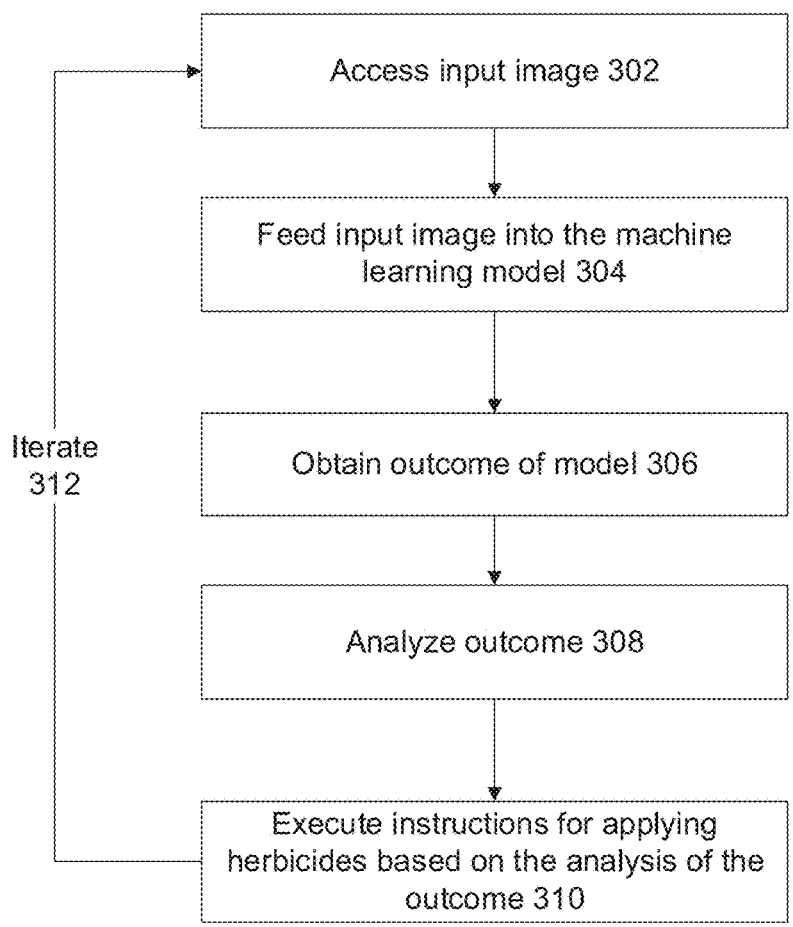
FIG. 3 is a flowchart of a method of dynamic customized application of herbicides to a to a target agricultural field, in accordance with some embodiments of the present invention.

Reference is now made to FIG. 1, which is a schematic of a block diagram of a system 100 for customizing a computing device 104 for dynamic application of herbicides to a target agricultural field and/or for using computing device 104 for dynamic application of herbicides to the target agricultural field, in accordance with some embodiments of the present invention. Reference is also made to FIG. 2, which is a flowchart of a method of customizing dynamic application of herbicides to a target agricultural field, in accordance with some embodiments of the present invention. Reference is also made to FIG. 3, which is a flowchart of a method of dynamic customized application of herbicides to a to a target agricultural field, in accordance with some embodiments of the present invention.

System 100 may implement the features of the method described with reference to FIGS. 2-6, by one or more hardware processors 102 of a computing device 104 executing code instructions 106A stored in a memory (also referred to as a program store) 106.

System 100 includes one or more imaging and treatment arrangements 108 connected to an agricultural machine 110, for example, a tractor, an airplane, an off-road vehicle, and a drone. Agricultural machine may include and/or be connected to a spray boom 110A and/or other types of booms. As used herein, the term spray boom is used as a not necessarily limiting example, and may be substituted for other types of booms. Imaging and treatment arrangements 108 may be arranged along a length of agricultural machine 110 and/or spray boom 110A. For example, evenly spaced apart every 2-4 meters along the length of spray boom 110A. Boom 110A may be long, for example, 10-50 meters, or other lengths. Boom 110A may be pulled along by agricultural machine 110.

One imaging and treatment arrangement 108 is depicted for clarity, but it is to be understood that system 100 may include multiple imaging and treatment arrangements 108 as described herein. It is noted that each imaging and treatment arrangement 108 may include all components described herein. Alternatively, one or more imaging and treatment arrangements 108 share one or more components, for example, multiple imaging and treatment arrangements 108 share a common computing device 104 and common processor(s) 102.

Each imaging and treatment arrangement 108 includes one or more image sensors, for example, a color sensor, optionally a visible light based sensor, for example, a red-green-blue (RGB) sensor such as CCD and/or CMOS sensors, and/or other cameras and/or other sensors such as infra-red (IR) sensor, near infrared sensor, ultraviolet sensor, fluorescent sensor, LIDAR sensor, NDVI sensor, a three dimensional sensor, and/or multispectral sensor. Image sensor(s) 112 are arranged and/or positioned to capture images of a portion of the agricultural field (e.g., located in front of image sensor(s) 112 and along a direction of motion of agricultural machine 110).

A computing device 104 receives the image(s) from image sensor(s) 112, for example, via a direct connection (e.g., local bus and/or cable connection and/or short range wireless connection), a wireless connection and/or via a network. The image(s) are processed by processor(s) 102, which feeds the image into a trained machine learning model 114A (e.g., trained on a training dataset(s) 114B). One treatment storage compartment 160 may be selected from multiple treatment storage compartments according to the outcome of ML model 114A, for administration of the treatment therein by one or more treatment application element(s), as described herein.

Hardware processor(s) 102 of computing device 104 may be implemented, for example, as a central processing unit(s) (CPU), a graphics processing unit(s) (GPU), field programmable gate array(s) (FPGA), digital signal processor(s) (DSP), and application specific integrated circuit(s) (ASIC). Processor(s) 102 may include a single processor, or multiple processors (homogenous or heterogeneous) arranged for parallel processing, as clusters and/or as one or more multi core processing devices.

Storage device (e.g., memory) 106 stores code instructions executable by hardware processor(s) 102, for example, a random access memory (RAM), read-only memory (ROM), and/or a storage device, for example, non-volatile memory, magnetic media, semiconductor memory devices, hard drive, removable storage, and optical media (e.g., DVD, CD-ROM). Memory 106 stores code 106A that implements one or more features and/or acts of the methods described with reference to FIGS. 2-6 when executed by hardware processor(s) 102.

Computing device 104 may include data repository (e.g., storage device(s)) 114 for storing data, for example, trained ML model(s) 114A which may include a detector component and/or a classifier component, and/or one or more training dataset(s) 114B (used to train ML model(s) 114A as described herein). Data storage device(s) 114 may be implemented as, for example, a memory, a local hard-drive, virtual storage, a removable storage unit, an optical disk, a storage device, and/or as a remote server and/or computing cloud (e.g., accessed using a network connection).

Computing device 104 is in communication with one or more treatment storage compartment(s) (e.g., tanks) 160 and/or treatment application elements 118 that apply treatment for treating the field and/or plants growing on the field. There may be two or more treatment storage compartment(s) 160, for example, one compartment storing chemical(s) specific to a target growth such as a specific type of weed, and another compartment storing broad chemical(s) that are non-specific to target growths such as designed for different types of weeds. There may be one or multiple treatment application elements 118 connected to the treatment storage compartment(s) 160, for example, a spot sprayer connected to a first compartment storing specific chemicals for specific types of weeds, and a broad sprayer connected to a second compartment storing non-specific chemicals for different types of weeds. Other examples of treatments and/or treatment application elements 118 include: gas application elements that apply a gas, electrical treatment application elements that apply an electrical pattern (e.g., electrodes to apply an electrical current), mechanical treatment application elements that apply a mechanical treatment (e.g., sheers and/or cutting tools and/or high pressure-water jets for pruning crops and/or removing weeds), thermal treatment application elements that apply a thermal treatment, steam treatment application elements that apply a steam treatment, and laser treatment application elements that apply a laser treatment.

Computing device 104 and/or imaging and/or treatment arrangement 108 may include a network interface 120 for connecting to a network 122, for example, one or more of, a network interface card, an antenna, a wireless interface to connect to a wireless network, a physical interface for connecting to a cable for network connectivity, a virtual interface implemented in software, network communication software providing higher layers of network connectivity, and/or other implementations.

Computing device 104 and/or imaging and/or treatment arrangement 108 may communicate with one or more client terminals (e.g., smartphones, mobile devices, laptops, smart watches, tablets, desktop computer) 128 and/or with a server(s) 130 (e.g., web server, network node, cloud server, virtual server, virtual machine) over network 122. Client terminals 128 may be used, for example, to remotely monitor imaging and treatment arrangement(s) 108 and/or to remotely change parameters thereof. Server(s) may be used, for example, to remotely collected data from multiple imaging and treatment arrangement(s) 108 optionally of different agricultural machines, for example, to create new training datasets and/or update exiting training dataset for updating the ML models with new images.

Network 122 may be implemented as, for example, the internet, a local area network, a virtual network, a wireless network, a cellular network, a local bus, a point to point link (e.g., wired), and/or combinations of the aforementioned.

Computing device 104 and/or imaging and/or treatment arrangement 108 includes and/or is in communication with one or more physical user interfaces 126 that include a mechanism for user interaction, for example, to enter data (e.g., define threshold and/or set of rules) and/or to view data (e.g., results of which treatment was applied to which portion of the field).

Exemplary physical user interfaces 126 include, for example, one or more of, a touchscreen, a display, gesture activation devices, a keyboard, a mouse, and voice activated software using speakers and microphone. Alternatively, client terminal 128 serves as the user interface, by communicating with computing device 104 and/or server 130 over network 122.

Treatment application elements 118 may be adapted for spot spraying and/or broad (e.g., band) spraying as described with reference to U.S. Provisional Patent Application No. 63/149,378, incorporated herein by reference in its entirety.

System 100 may include a hardware component 116 associated with the agricultural machine 110 for dynamic adaption of the herbicide applied by the treatment application element(s) 118 according to dynamic orientation parameter(s) computed by analyzing an overlap region of images captured by image sensors 112, as described with reference to U.S. Provisional Patent Application No. 63/082,500.

Referring now back to FIG. 2, at 202, a machine learning model is provided and/or trained.

Alternatively or additionally, the machine learning model may be selected from multiple candidate machine learning models.

There may be a single main machine learning model, which is customized for different target agricultural fields. Such single main machine learning model may be trained on a training dataset of sample images from different sample fields, depicting multiple different weed parameters, optionally over different combinations of field parameters. For example, trained on fields in different countries, during different seasons, depicting different crops (e.g., corn, wheat, cotton, potatoes), depicting different weed species and/or weeds at different stages of growth. In such implementation, the training images may be labelled with ground truth labels indicating field parameters of the respective same field where the respective sample training image is obtained from. During interference, the field parameters of the target field for which the input image is captured may be fed into the model with the input image.

Exemplary field parameters include: geographical location (e.g., county, stage, country, GPS coordinates), season, phase during an agricultural growth cycle, soil type, whether soil is tilled, whether soil is untilled, weather, and desired crop being grown.

It is noted that some parameters may be included as field parameters and/or as weed parameters, for example, percentage coverage of the field by weeds of one or more weed parameters (e.g., percentage coverage of fully grown weeds of a certain species, percentage coverage of small weeds of many different species).

Alternatively, there are multiple more specific machine learning models. One of the more specific machine learning models may be selected, and then used in a customized manner for the target agricultural. Each specific machine learning models may be trained on a respective training dataset, where each respective training dataset includes different training images from different sample agricultural fields of different combinations of field parameters, and/or depict different weed parameters. For example, a first machine learning model is trained on a first training dataset depicting corn growth in Illinois, and a second machine learning model is trained on a second training dataset depicting wheat growing in Saskatchewan. In such implementation, the training images may be selected from agricultural fields having certain field parameters. Different models may be created to correspond to different field parameters. The model may be selected according to field parameters of the training images that correspond to field parameters of the target agricultural field. During interference, the field parameters of the target field for which the input image is captured do not need to necessarily fed into the model with the input image, since the model has been trained on images with similar field parameters.

Alternatively, the machine learning model is specific for the target agricultural field, trained on training images obtained from the target agricultural field.

The training images may be labelled with a ground truth indication of weed parameters depicted in the respective image and/or field parameters of the agricultural field depicted in the respective image. Labelling may be performed, for example, manually by a user (e.g., drawing a boundary box around the weeds, and/or manually entering parameters) and/or automatically by code (e.g., based on a database of known weed parameters and/or field parameters, based on sensor data such as weather sensors). Machine learning models trained using labelled training images may be trained using supervised approaches. Machine learning models may be trained using unsupervised approaches on training images that are not necessarily labelled, for example, by clustering similar growths identified in images. When no crops are depicted, all growths may be assumed to be weeds.

Exemplary weed parameters include an indication of a weed (e.g., in general), a specific weed species, and growth stage of the weed (e.g., pre-sprouting, sprout, seedling, and adult).

Exemplary architectures include a detector architecture, a classifier architecture, and/or a pipeline combination of detector(s) and/or classifier(s), for example, statistical classifiers and/or other statistical models, neural networks of various architectures (e.g., convolutional, fully connected, deep, encoder-decoder, recurrent, graph), support vector machines (SVM), logistic regression, k-nearest neighbor, decision trees, boosting, random forest, a regressor, and/or any other commercial or open source package allowing regression, classification, dimensional reduction, supervised, unsupervised, semi-supervised or reinforcement learning. Machine learning models may be trained using supervised approaches and/or unsupervised approaches.

Optionally the machine learning model is implemented as and/or includes a detector component that generates an outcome of boxes in response to the input image. Each box represents a respective weed having at least one weed parameter depicted therein. The detector component may be trained on a training dataset of sample images labelled with ground truth sample boxes each depicting a sample weed having at least one weed parameter therein.

Alternatively or additionally, the machine learning model is implemented as and/or includes a classifier component that generates an outcome of probability of the at least one weed parameter being depicted in the image. The classifier component may be trained on a training dataset of sample images tagged with a ground truth label indicating presence or absence of sample weeds having weed parameters depicted therein.

Alternatively or additionally, the machine learning model is implemented as and/or includes a detection pipeline. The pipeline may include the detector component (i.e., that generates an outcome of boxes in response to the input image, where each box represents a respective weed of at least one weed parameter depicted therein), and the classifier component that receives portions of the input image extracted according to the boxes generated by the detector component. The classifier component generates an outcome of a probability of the weed being depicted in the input portions of the image.

The detection and/or classification models may be trained separately. Training may be an iterative process which adjusts the model's parameters according to its mistakes in classification/detection. In each step the model is fed data in batches and is tested against some metric (e.g., a loss\cost function). Based on the results, the parameters are optimized towards the correct decision. At the end of the training process, the models are able to generalize and perform well on images never seen before. The training process tries to minimize the localization and classification error. It may use random image augmentations (rotation, blurs, noise addition, alpha blending, pixel dropout, contrast changes, etc.). The generators used may balance the number of samples per class for each epoch. Online Hard Example Mining mechanism may be used for a smarter and more robust training process.

An exemplary detection pipeline is described below with reference to FIG. 5.

Referring now back to FIG. 2, at 204, test images are obtained. The test images correspond to the target agricultural field. For example, the test images depict the target agricultural field itself. In another example, the test images depict a sample agricultural field that is correlated with the target agricultural field, for example, similar in terms of weed parameters and/or field parameters. For example, the target field is a corn field in southern Illinois, and the sample agricultural fields are other corn fields located in southern Illinois. Images of the target agricultural field may be similar to images of the sample agricultural field, for example, cannot be distinguished by a discriminative network.

Optionally, the test images are captured by an imaging sensor at a resolution corresponding to a target resolution of a target imaging sensor that is designed to capture input image(s), as described herein.

At 206, the test images are fed into the (e.g., selected) trained machine learning model. Test images may be sequentially fed into the trained machine learning model.

The test image(s) may be fed into the machine learning model with one or more field parameters of the target agricultural field.

At 208, one or more performance metrics are computed for the trained machine learning model from the outcomes of the trained machine learning model in response to the feeding of the test image and optionally the field parameter(s).

There may be one or multiple weed parameters detected and/or classified per test image. Weed parameter(s) may be associated with identified object(s) in the respective test image. For example, a seedling in an image may be associated with the weed parameter indicating seedling and/or with the weed parameter indicating a specific weed species.

Each identified weed parameter is associated with a probability value indicative of accuracy of the classification and/or detection of the respective weed parameter.

Optionally, performance metric(s) are computed for each weed parameter, and/or combination of weed parameter(s). For example, for each weed specifies, each stage of growth for different weed specifies, and/or each stage of growth of each weed specifies.

Exemplary performance metric(s) include:
Object and/or weed parameter recall\sensitivity—the proportion of object and/or weed parameter proposals that are correctly identified as objects and/or weed parameters.
Object and/or weed parameter false positive rate—the proportion of object proposals that are incorrectly identified as objects and/or weed parameter.
Confusion Matrix variants—in order to assess the classification performance at different class divisions and which classes are more error-prone than others (e.g., mistake between a grass leaf and corn is more common than a broad leaf and corn).
Area under curve (AUC).
Accuracy.

At 210, one or more specific weed parameter are selected from the multiple known weed parameters (e.g., set of weed parameters used to label the training images) according to the performance metric(s).

Analyzing the performance metric(s) enables determining which objects and/or weed parameters are detected and/or classified correctly and which ones are not. This analysis is done with respect to known ground truth labels. Based on the analysis, the robustness of the pipeline is determined for successfully detecting each of the weed parameters the model is trained to distinguish. Substances that complement the deficiencies of the pipeline may be are recommended.

The performance metric(s) may be analyzed based on current and/or predicted weed parameter(s) of the target field, for example, per each specific target field. Examples of predicted weed parameters include which weed species are growth in the target field, growth stages of the weeds, and/or coverage percentages. The predicted weed parameter(s) of the specific target field may be obtained manually, for example, by visually examining the field, and/or by a domain expert with knowledge of the field and/or weeds. The expected weed spectrum may be obtained automatically, for example, by analyzing test images of the target field, and/or from a database storing historical and/or current data of the target field (e.g., collected from sensors and/or manual input.

Optionally, a single weed parameter, and/or single combination of weed parameters is selected, for example, weed parameter(s) having highest performance metric(s).

Alternatively or additionally, one or more weed parameter, and/or one or more combinations of weed parameters are selected.

The weed parameter(s) and/or combinations thereof may be selected when the performance metric of the machine learning model is above a threshold. The threshold may be, for example, 85%, 90%, 95%, or other values, or within a range and/or a range of, for example, 85%-98%, or 90-95%, or other ranges. The threshold may be selected, for example, based on tradeoff of the benefits and/or advantages of being accurate versus non-accurate. For example, for an herbicide that is potent to weeds but may kill good crops, a high accuracy is desirable to reduce risk of killing good crops by mistake. For an herbicide with minimal environmental data, a low accuracy may be good enough, since even if the outcome is incorrect, no excess environmental harm is necessarily done.

When a detection pipeline that includes a detector component and a classification component is implemented, the threshold may be set separately for the classification component and/or for the classification component, optionally per weed parameter(s). For example, for weeds which are visually similar to the ground, accurate detection is more important, i.e., ability to distinguish the weed from the ground. In such scenario, the threshold may be set for the detector component (e.g., 90%). In another example, for weeds which are visually similar to the desired crops, accurate classification is more important, i.e., the detector may accurately detect the presence of a growth (i.e., object), the ability to correctly classify and distinguish the growth (i.e., object) as being a weed rather than the crop is more relevant. In such scenario, the threshold may be set for the classifier component (e.g., 90%).

Optionally, one or more (e.g., set) of the multiple weed parameters are designated as non-specific weed parameters when the performance metric (e.g., accuracy of classification) of the machine learning model is below the threshold.

Weed parameter(s) for which the performance metric(s) is above the threshold may be designated as specific weed parameters, and/or weed parameter(s) for which the performance metric(s) is below the threshold may be designated as non-specific weed parameters. For example:

The specific weed parameter is of one or more species of weed for which accuracy is above the threshold, and the non-specific weed parameters is of one or more species of weed for which accuracy is below the threshold. The threshold may be selected to accurately distinguish between certain specifies. Some weed specifies may be reliably detected, while others may not be reliably detected.

The specific weed parameter and the non-specific weed parameter are of a same species of weed of different sizes during different growth stages. The test images depict the same specifies of weed at various sizes and/or various stages of growth). The threshold is set to differentiate between weeds of the same species depicted in input images that are above a size threshold (e.g., weeds of growth stage(s) above the size threshold) and weeds of the same species depicted in the image below the size threshold (e.g. weeds of growth stage(s) below the size threshold). For example, when the imaging sensor captures images with a resolution of about 1 millimeter per pixel, weeds that are smaller than about 15-20 pixels, i.e., smaller than about 15-20 millimeters may not be accurately detected. The size threshold may be set at about 15-20 millimeters.

The test images may depict weeds that are of various visual similarities to a ground, i.e., the weeds are visually similar to the agricultural field depicted in the test images. The threshold may be set to differentiate detection of weeds depicted in the input image that are non-similar to the ground and weeds depicted in the input image that are similar to the ground. Such scenario may occur, for example, when the machine learning model is implemented as the detector component. The threshold may be set for the detector component.

The test images may depict weeds that are of various visual similarities to the desired crop. The threshold may be set to differentiate classification of weeds that are visually similar to the desired crop from weeds that are visually non-similar to the desired crop. Such scenario may occur, for example, when the machine learning model is implemented as the classifier component. The threshold may be set for the classification component.

At 212, instructions for triggering application of herbicides are set up, for example, code is automatically generated, set of rules to be followed during run-time are automatically generated, and/or a controller that controls application of the herbicides is programmed.

The instructions may be generated using, for example, domain knowledge, information of the herbicides (e.g., environmental impact), and/or costs of the herbicides, optionally based on tradeoffs.

The instructions are for being implemented during run-time, when input images are captured by image sensor(s). Image sensor(s) may be located on an agricultural machine that maneuvers over the target agricultural field, for example, a spray boom and/or tractor. The input image depicts a respective portion of the agricultural field. The input image is fed into the machine learning model to obtain the outcome. The outcome may be compared to the threshold.

Optionally, the instructions are for at least two cases, for example, a specific case, and a default (i.e., non-specific) case. The specific case may be when the outcome of the machine learning model indicates specific weed parameter(s) being depicted in the respective input image, for example, the value of the outcome (e.g., probability) is above the threshold. The default case may be when the outcome of the machine learning model does not indicate that the specific weed parameter(s) are being depicted in the respective input image, for example, the value of the outcome (e.g., probability) is below the threshold.

Optionally, the instructions that are set up are for triggering application of a first herbicide to the portion of the target agricultural field (e.g., depicted in the input image) in response to the outcome of the machine learning model indicating likelihood of the specific weed parameter(s) being depicted in an input image of the portion of the target agricultural field, for example, when the outcome is above the threshold.

Alternatively or additionally, the instructions that are set up are for triggering application of a second herbicide to the portion of the target agricultural field (e.g., depicted in the input image) in response to the outcome of the machine learning model indicating non-likelihood of specific weed parameter(s) being depicted in the input image, for example, when the outcome is below the threshold.

In summary, application of the first herbicide is triggered when the outcome of the machine learning model is above the threshold, application of the second herbicide is triggered when the outcome of the machine learning model is below the threshold.

The first herbicide and the second herbicide may be liquid chemicals stored in respective containers on the agricultural machine. Treatment application elements for application of the chemicals to the target agricultural field may be installed on the agricultural machine.

The first herbicide may be a specific herbicide selected for treating weeds having the specific weed parameter(s), for example, designed to kill weeds of a specific species and/or weeds at specific stages of growth.

The second herbicide may be a broad (e.g., non-specific) herbicide selected for treating weeds having a subset of the weed parameters that exclude the specific weed parameter, for example, input images that do not have the outcome above the threshold indicating the specific weed parameter(s), and/or input image for which the outcome is below the threshold. For example, no weeds are detected in the image, weeds are of an uncertain species, and/or weeds are of an uncertain growth stage. The second herbicide may be designed to treat weeds having weed parameters of multiples species of weeds prior to sprouting from the ground, and/or small weeds less than a size threshold.

The setting up of the instructions for triggering application of the first herbicide may be for using a spot treatment application element designed to apply treatment to a specific spot depicted in the input image. The setting up of the instructions for triggering application of the second herbicide may be for using a broadcast treatment application element designed to apply treatment using a broadcast approach to a broad region, which may be depicted in the input image.

For example, for corn, two treatments are performed. The first is a PRE treatment, before the corn sprouts. The second is a POST treatment, about a month after the corn sprouts. For PRE treatment, for a spot application (i.e., when the probability outcome for the image is greater than the threshold), the herbicides glyphosate and glufosinate may be selected. For the broadcast application (i.e., when the probability outcome for the image is less than the threshold), atrazine, mesotrione and S-metolachlor may be selected. For the POST treatment, for the spot application, dicamba+ diflufenzopyr may be selected. For the broadcast application, glyphosate and mesotrione may be selected. The spot application reduces the amount of chemical that is used, which reduces environmental impact, is more specific, and/or reduces overall costs, for example, in applying the broadcast treatment to the entire field.

At 214, one or more features described with reference to 202-212 may be iterated, for example, for the same target agricultural field during different seasons and/or different stages of the agricultural growth cycle. In another example, the iterations are performed per target agricultural field, for example, different fields at different geographical locations and/or growing different target crops and/or having different soils.

Referring now back to FIG. 3, at 302, an input image is accessed.

The input image depicts a respective portion of the target agricultural field.

The respective input image may be captured by an imaging sensor located on an agricultural machine, for example, a spray boom.

Multiple input images may be captured at substantially the same time, for example, during the same time interval. For example, multiple imaging sensors are located along a length of the spray boom. Each image sensor captures a portion of the field, where the multiple imaging sensors capture multiple images along the length of the field.

Treatment application elements that apply the herbicides may be connected to the spray boom. For example, each imaging sensor is associated with one or more treatment application elements that apply the selected herbicide(s) to the portion of the field depicted in the input image(s) captured by the corresponding imaging sensor.

Optionally, the input images are captured by an imaging sensor at a target resolution corresponding to the resolution of the imaging sensors that captured the test images which were used to compute the performance metric(s) of the machine learning model, as described herein.

At 304, the respective input image(s) is fed into the machine learning model, which was selected and/or provided and/or trained as described with reference to 202 of FIG. 2.

Optionally, field parameters of the target agricultural field are fed into the machine learning model in association with the input image(s). Alternatively, the machine learning model is selected to correspond to the field parameters of the target agricultural field (e.g. the model is trained on sample images captured from sample fields having field parameters corresponding to the target agricultural field) without necessarily requiring feeding the field parameters into the machine learning model.

At 306, an outcome of the machine learning model is obtained for the input image. For example, probability of the specific weed parameter(s) (e.g., selected as described with reference to 2) being depicted in the input image.

At 308, the outcome of the machine learning model is analyzed to determine likelihood of the specific weed parameter being depicted in the respective input image, for example, the probability outcome is compared to the threshold, to determine whether the probability is above or below the threshold.

At 310, instructions are executed based on the analysis of the outcome.

Optionally, in response to the specific weed parameter(s) likely being depicted in the respective input image (e.g., probability is above the threshold), application of the first herbicide to the respective portion of the target agricultural field depicted in the input image is instructed.

Alternatively, in response to the specific weed parameter(s) non-likely being depicted in the respective input image (e.g., probability is below the threshold), application of the second herbicide to the respective portion of the target agricultural field depicted in the input image is instructed.

The treatment application element(s) may be arranged on the agricultural machine (e.g., spray boom) to apply the selected first or second herbicide to the portion of the target agricultural field depicted in the input image captured by the imaging sensor located on the spray boom.

Optionally, the spot spraying and/or broad spraying are applied using the system and/or components thereof as described with reference to U.S. Provisional Patent Application No. 63/149,378, incorporated herein by reference in its entirety.

Optionally, the instructions are according to dynamic orientation parameter(s) computed by analyzing an overlap region of images captured by two or more imaging sensors located on the agricultural machine, for execution by one or more hardware components associated with the agricultural machine for dynamic adaptation of the herbicide applied by the treatment application element(s) to the portion of the agricultural field depicted in the images, which may include the input image(s), to obtain a target treatment profile, as described with reference to U.S. Provisional Patent Application No. 63/082,500, incorporated herein by reference in its entirety.

At 312, one or more features described with reference to 302-310 are iterated, for example, during maneuvering of the agricultural machine over multiple portions of the target agricultural field. The triggering of the iterations may be synchronized with movement of the agricultural machine. For example, when each image captures 1 meter of the field, the imaging sensor may be triggered to capture each image every 1 meter of movement of the agricultural machine. In another example, when the agricultural machine moves at 1 meter per second, the imaging sensor may be triggered to capture a respective image every second.

Figure 4:
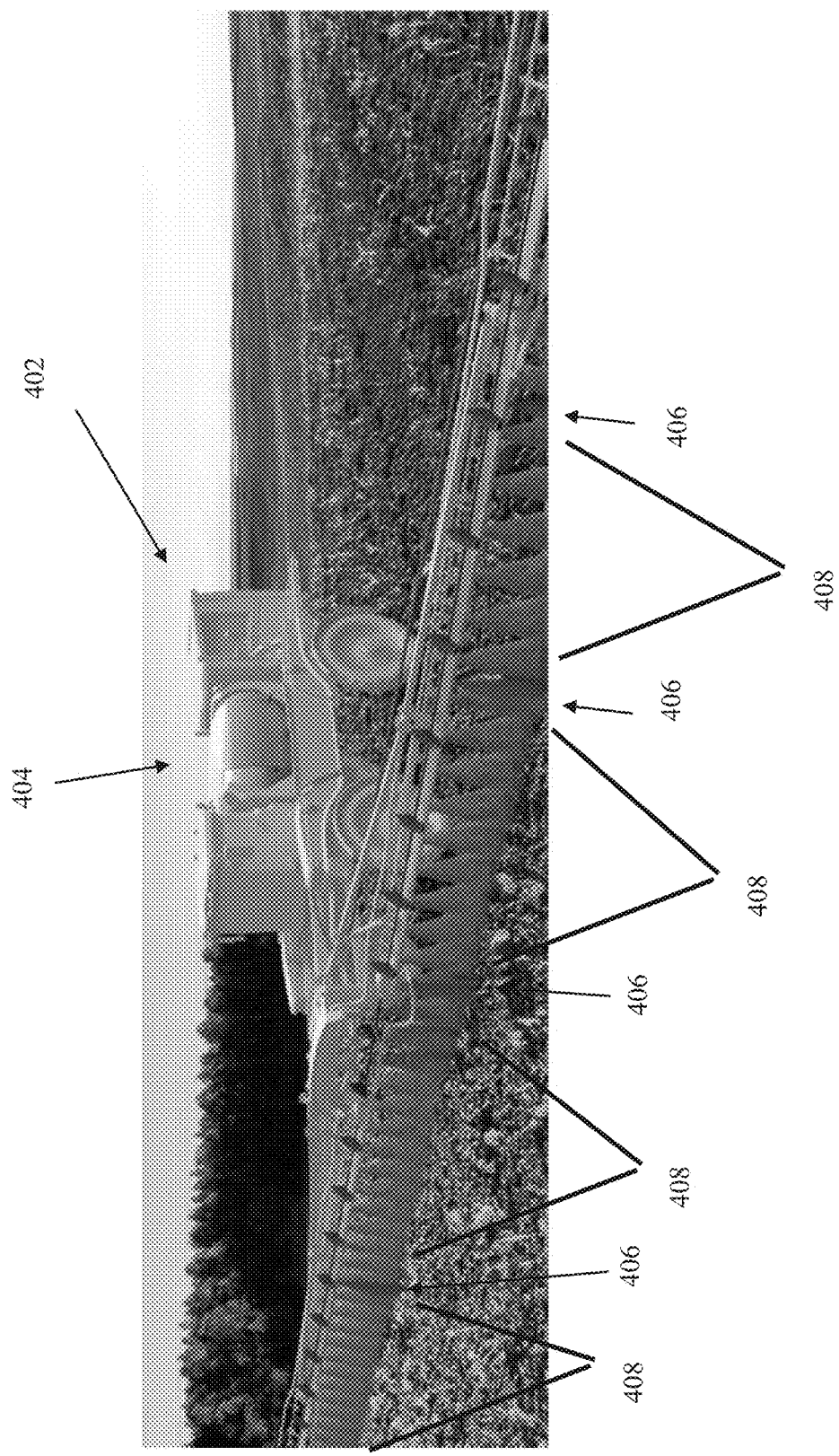
FIG. 4 is a schematic of an agricultural machine with two containers storing two herbicides for selective treatment of an agricultural field based on outcome of a machine learning model in response to an input image, in accordance with some embodiments of the present invention.

Reference is now made to FIG. 4, which is a schematic of an agricultural machine 402 with two containers 404 storing two herbicides for selective treatment of an agricultural field based on outcome of a machine learning model in response to an input image, in accordance with some embodiments of the present invention. A first herbicide 406 is applied to a respective portion of the target agricultural field using spot spraying in response to the outcome of the machine learning model indicating likelihood of specific weed parameter(s) being depicted in the input image, as described herein. A second herbicide 408 is applied to a different respective portion of the target agricultural field using broad spraying in response to the outcome of the machine learning model indicating non-likelihood of specific weed parameter(s) being depicted in the input image, as described herein.

Figure 5:
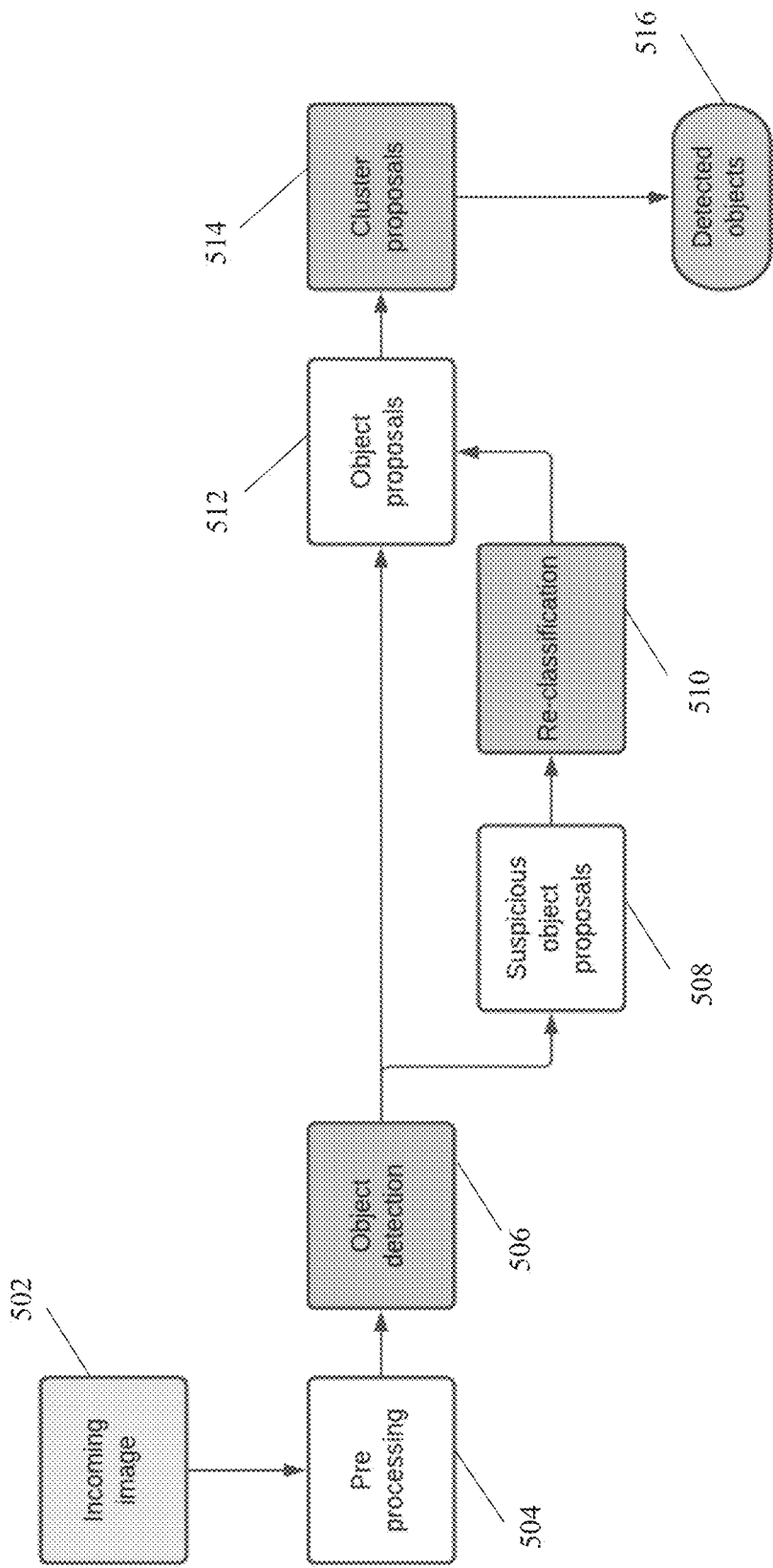
FIG. 5 is a flowchart of an exemplary detection pipeline for detecting one or more weed parameters, in accordance with some embodiments of the present invention.

Reference is now made to FIG. 5, which is a flowchart of an exemplary detection pipeline for detecting one or more weed parameters, in accordance with some embodiments of the present invention. The weed parameters may indicate presence of a specific species of weed, optionally one of multiple weeds, and/or weeds at specific stages of growth.

At 502, an input image depicting a portion of the agricultural field is obtained.

At 504, the input image may be preprocessed, for example, converting an RGB image (3 channel) to a single channel, noise reduction (e.g., smoothing using Gaussian filter).

At 506, the input image is fed into an object detector component (e.g., neural network), that generates bounding boxes, each bounding box is associated with a probability value indicating likelihood of respective weed parameter(s) being depicted therein. For example, bounding boxes are generated for specific weed species. The number of boxes may be, for example, over 10, over 25, over 50, and other numbers. It is noted that boxes may overlap, and/or multiple boxes may depict the same object therein.

For bounding boxes with probabilities higher than a threshold, the process proceeds to 512 (skipping 508 and 510). For example, probability is >90%. Alternatively, for bounding boxes with probabilities lower than the threshold, but optionally higher than a second lower threshold, the process proceeds to 508 (and then 510, before returning to 512). For example, probability is below 90%, but higher than 5%, or 10%, or 20%, or 25%, or other value.

At 508, the bounding boxes, which represent suspicious object proposals (i.e., not clear if an object is depicted therein or not), are fed into a classifier component (e.g., another neural network) that generates another probability indicating a numerical likelihood of the presence of each of multiple weed parameter(s) being depicted in the respective box. A patch of the image depicted by the bounding box may be extracted, and the patch (rather than the entire image) is fed into the classifier. The classifier, which may be trained on labelled patches of images, may provide a more accurate indication of the weed parameter(s) depicted in the respective patch.

At 510, the weed parameter(s) identified in the respective bounding box may be re-classified based on the outcome generated by the classifier. For example, the detector identified a weed in a bounding box as a first weed species with probability of 50%, and the classifier, when fed a patch of the bounding box, identified a second weed species with probability of 90%. The bounding box is re-classified to include the second weed species. Alternatively, the weed parameter(s) identified in the respective bounding box may be confirmed based on the outcome generated by the classifier. For example, the detector identified a weed in a bounding box as a specific weed species with probability of 30%, and the classifier, when fed a patch of the bounding box, identified the same specific weed specifies with probability of 92%. The bounding box is confirmed to include the specific weed species.

At 512, bounding boxes associated with one or more objects depicted therein, each associated with a respective weed parameter(s), are obtained for the image. Bounding boxes with probabilities above a threshold may be selected. Bounding boxes with probabilities below the threshold may be ignored.

The selected bounding boxes includes bounding boxes for which the probability outcome of the detector is above the threshold, and for which the probability outcome of the classifier is above the threshold (where originally the probability outcome of the detector was below the threshold).

At 514, bounding boxes are clustered. The bounding boxes may be clustered according to respective weed parameter(s) depicted therein.

The clusters may be analyzed to determine whether the cluster represents a true finding of the respective weed parameter depicted therein, or an error. For example, the greater the number of boxes that overlap in a common region, the greater the likelihood that the weed parameter is depicted in the common region. For example, when a first cluster includes two bounding box for a first weed parameter, and a second cluster includes 15 overlapping bounding boxes for a second weed parameter, the second cluster is more likely to depict a true second weed parameter, and the first cluster is likely an error.

A final probability value may be computed for the respective weed parameter of each cluster.

At 516, detected objects, i.e., weed parameter(s) thereof, for which the final probability is above the threshold based on the computed performance metric of the detection pipeline may be provided. For example, weeds of a specific species are identified, and/or weeds at specific stages of growth are identified.

The herbicide is selected according to the final probability, for example, for spot spraying using a first herbicide or for broad spraying using a second herbicide, as described herein.

Figure 6:
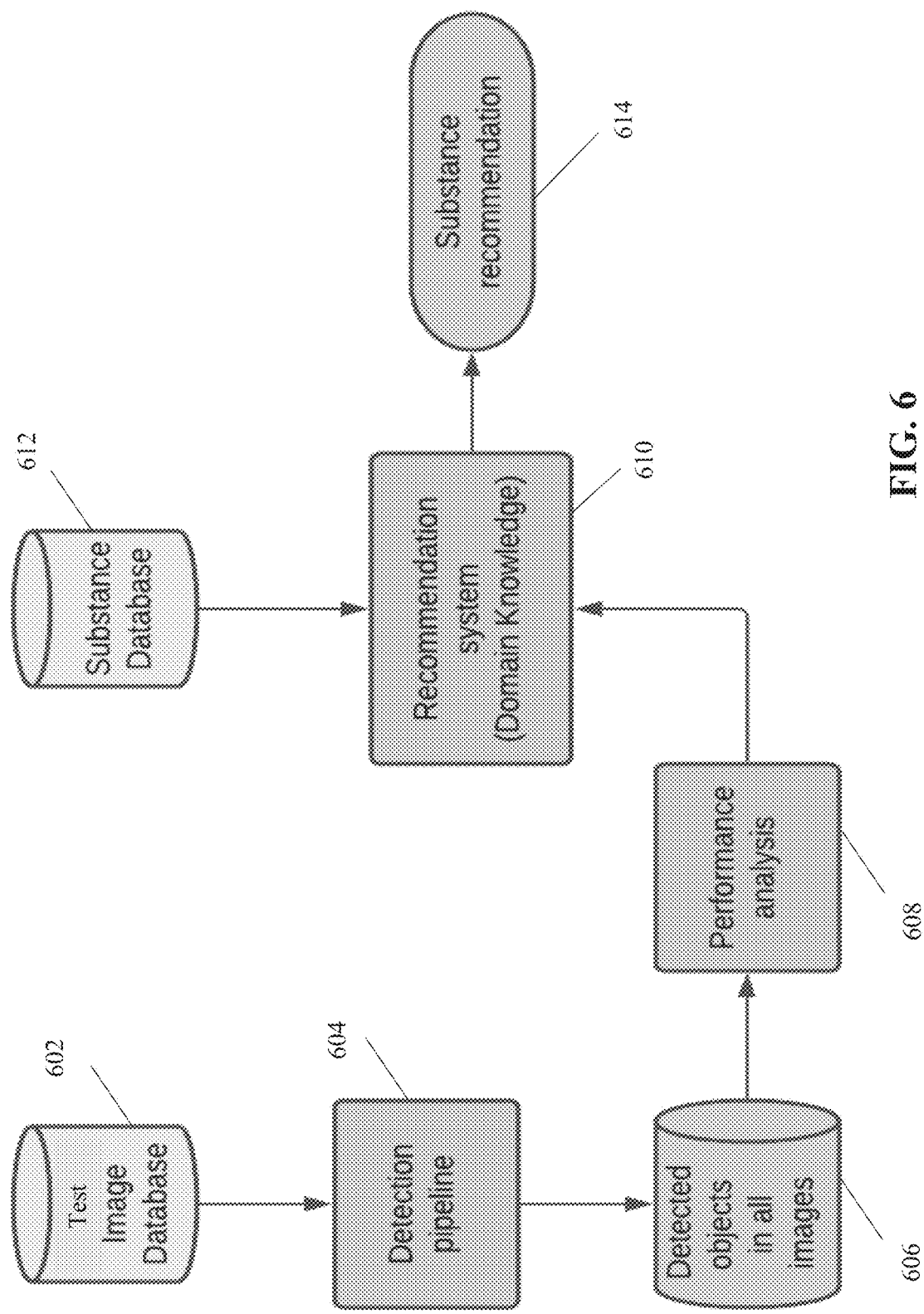
FIG. 6 is flowchart of an exemplary process of customizing selection of herbicides according to weed parameters detected in images of a portion of an agricultural field, in accordance with some embodiments of the present invention.

Reference is now made to FIG. 6, which is flowchart of an exemplary process of customizing selection of herbicides according to weed parameters detected in images of a portion of an agricultural field, in accordance with some embodiments of the present invention. The method of FIG. 6, may be based on, correspond to, and/or be combined with, the method described with reference to FIG. 2, FIG. 5, and/or using the system described with reference to FIG. 1.

At 602, test images are selected. The test images may be selected by matching and/or correspondence between field parameters of sample fields for which the test images were captured and field parameters of target agricultural field(s), for example, as described herein.

At 604, the test images are fed into a detection pipeline, for example, as described herein.

At 606, objects, optionally weed parameter(s) associated with the objects, detected in the test images, are obtained as an outcome of the detection pipeline, for example, as described herein. Weed parameter(s) may be associated with identified object(s) in the respective test image. For example, a seedling in an image may be associated with the weed parameter indicating seedling and/or with the weed parameter indicating a specific weed species.

Each object and/or weed parameter associated with the object is associated with a probability value indicative of accuracy of the classification and/or detection of the respective object and/or weed parameter.

At 608, a performance analysis of the detection pipeline's ability to accurately detect and/or classify weed parameter(s) in the test images is performed based on the outcomes.

At 610, a recommendation system applies domain knowledge to generate a substance recommendation of substances stored in a substance database 612. For example, weed parameters which are accurately detected and/or classified by the detection pipeline, such as when the probability values are above a threshold, are identified. A specific substance, optionally an herbicide, is selected for each identified weed parameter. For example, specific substances are selected to kill specific weeds, and/or specific herbicides are selected to kill weeds at specific growth stages. For weed parameter(s) for which the detection pipeline is unable to accurately detect and/or classify (e.g., probability below the threshold), an appropriate herbicide is selected, for example, a broad herbicide designed to kill a variety of weeds and/or weeds at a variety of growth stages.

At 614, the substance recommendation is provided. A computer device (e.g., controller) of an agricultural machine may be set up to selectively apply the difference recommended substances based on outcome of the detection pipeline fed images captured from the target agricultural field, for example, as described herein.

Figure 7:
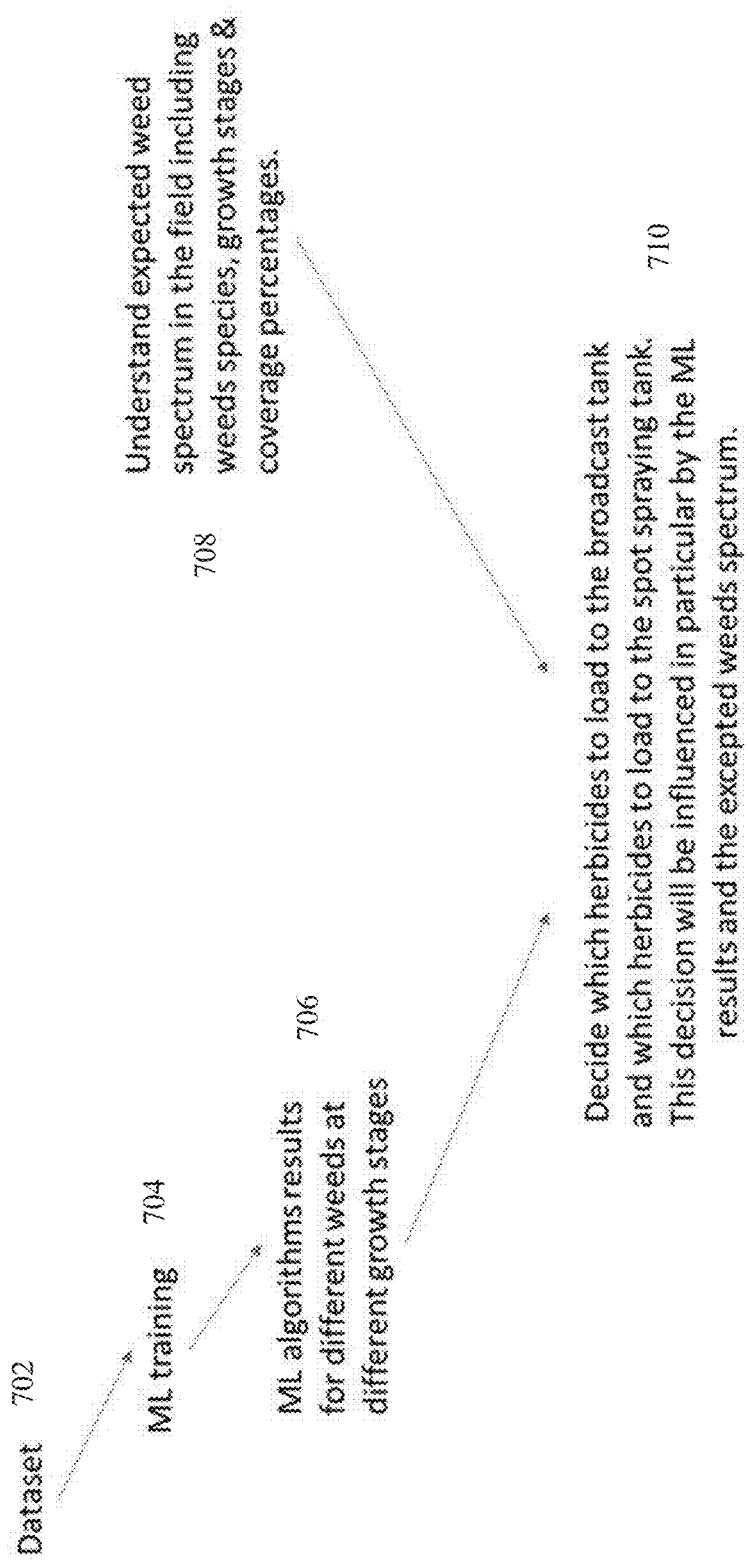
FIG. 7, which is a flowchart of an exemplary method of selecting different herbicides for different applications to a target field, in accordance with some embodiments of the present invention.

Reference is now made to FIG. 7, which is a flowchart of an exemplary method of selecting different herbicides for different applications to a target field, in accordance with some embodiments of the present invention. The method described with reference to FIG. 7 may represent an exemplary implementation based on the systems and/or methods described with reference to FIGS. 1-6, for example, implemented and/or be combined with components and/or features described with reference to systems and/or methods described with reference to FIGS. 1-6.

At 702, a training dataset is provided and/or selected. The training dataset may include sample images from sample fields that are correlated with one or more target fields (i.e., images of the target field which will be fed into the trained machine learning model during inference), depicting similar weed parameters (e.g., similar weed species and/or similar stages of growth and/or similar size weeds) and/or depicting similar field parameters (e.g., similar soil type, similar soil state, similar geographical location, similar time during an agricultural season). Alternatively or additionally, the training dataset depicts sample images from sample fields which are not necessarily correlated with any specific target fields, but may serve as a "general" training dataset for a wide range of different target fields. Such training dataset may include sample images depicting different weed parameters from fields of different field parameters.

Exemplary training datasets are discussed, for example, with reference to 202 of FIG. 2. At 704, one or more machine learning (ML) models are trained on the training dataset(s). For example, a customized ML model may be trained on the training dataset with sample images from sample fields that are correlated with one or more target fields, optionally a specific target field. Alternatively or additionally, a broad and/or general ML model may be trained on the training dataset with samples images from sample images depicting different weed parameters from fields of different field parameters.

Exemplary approaches for training ML models are discussed, for example, with reference to 202 of FIG. 2.

At 706, outcome results of the ML model(s) for different weeds and/or at different growth stages, i.e., for different weed parameters, are obtained.

The outcome results may be obtained by feeding test images into the trained ML model, and evaluating performance metrics of the trained ML model for the different weed parameters. The test images may obtained from the target field itself, and/or from other fields which correspond to the target field, for example, have similar weed parameters and/or field parameters. The test images may be obtained from non-specific fields which do not necessarily have similar weed parameters and/or field parameters, for example, to evaluate the general performance of the ML model for many different weed parameters and/or field parameters.

Exemplary approaches for obtaining results of the ML models and/or computing performance outcomes are described, for example, with reference to 204-208 of FIG. 2 and/or 602-608 of FIG. 6.

At 708, expected weed spectrum (i.e., of weed parameters) in the target field is obtained, for example, which weed species are growth in the target field, growth stages of the weeds, and/or coverage percentages. The expected weed spectrum may be obtained manually, for example, by visually examining the field, and/or by a domain expert with knowledge of the field and/or weeds. The expected weed spectrum may be obtained automatically, for example, by analyzing test images of the target field, and/or from a database storing historical and/or current data of the target field (e.g., collected from sensors and/or manual input).

Exemplary approaches for obtaining the expected weed spectrum is described, for example, with reference to 210 of FIG. 2 and/or 610 of FIG. 6.

At 710, a decision is made, of which herbicides to load into a broadcast tank for broadcast application to the target field by a broadcast treatment applicator, and which herbicides to load into a spot spraying tank for spot spraying application to the target field by a spot spraying treatment applicator. The decision is influenced by the ML results and/or by the expected weeds spectrum.

The decision may be made, for example, automatically by a defined set of rules, a trained classifier (e.g., trained on a training dataset of sample ML results and/or sample expected weeds spectrum, labelled with a ground truth of herbicides loaded into the broadcast tank and herbicides loaded into the spot spraying tank, the ground truth may be for example manually set by a domain expert), and/or manually (e.g., by a domain expert).

For example, herbicides for weeds species for which the ML model has a high performance over a threshold (e.g., accuracy >90%) may be loaded into the spot spraying tank. For weeds which are very small and/or that look visually similar to the desired crop being grown in the target field, for which the ML model has a low performance below the threshold (e.g., accuracy <90%) may be loaded into the broadcast spraying tank.

Exemplary approaches for deciding which herbicides to load is described, for example, with reference to 210 and/or 212 of FIG. 2 and/or 610 of FIG. 6.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant machine learning models and/or performance metrics will be developed and the scope of the term machine learning model and/or performance metric is intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

It is the intent of the applicant(s) that all publications, patents and patent applications referred to in this specification are to be incorporated in their entirety by reference into the specification, as if each individual publication, patent or patent application was specifically and individually noted when referenced that it is to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A system for customizing a computing device for dynamic application of herbicides to a target agricultural field, comprising:
    at least one hardware processor executing a code for:
        feeding a plurality of test images corresponding to the target agricultural field into a machine learning model trained on a training dataset of a plurality of sample images of at least one sample agricultural field labelled with ground truth of a plurality of weed parameters;
        selecting at least one specific weed parameter of the plurality of weed parameters according to at least one performance metric of the machine learning model;
        setting up instructions for triggering application of a first herbicide to a portion of the target agricultural field in response to an outcome of the machine learning model indicating likelihood of the at least one specific weed parameter being depicted in an input image of the portion of the target agricultural field; and
        setting up instructions for triggering application of a second herbicide to the portion of the target agricultural field in response to the outcome of the machine learning model indicating non-likelihood of the at least one specific weed parameter being depicted in the input image;
    wherein the selecting is performed when an accuracy of classification of the machine learning model for at least one certain weed parameter is above a threshold;
    wherein the specific weed parameter and the non-specific weed parameter are of a same species of weed of different sizes during different growth stages, wherein test images depict same weed species of various sizes and/or various growth stages, wherein the threshold is set to differentiate between weeds depicted in input images that are of growth stages above a size threshold and weeds depicted in the image that are of other growth stages below the size threshold.

2. A system for customizing a computing device for dynamic application of herbicides to a target agricultural field, comprising:
    at least one hardware processor executing a code for:
        feeding a plurality of test images corresponding to the target agricultural field into a machine learning model trained on a training dataset of a plurality of sample images of at least one sample agricultural field labelled with ground truth of a plurality of weed parameters;
        selecting at least one specific weed parameter of the plurality of weed parameters according to at least one performance metric of the machine learning model;
        setting up instructions for triggering application of a first herbicide to a portion of the target agricultural field in response to an outcome of the machine learning model indicating likelihood of the at least one specific weed parameter being depicted in an input image of the portion of the target agricultural field; and
    setting up instructions for triggering application of a second herbicide to the portion of the target agricultural field in response to the outcome of the machine learning model indicating non-likelihood of the at least one specific weed parameter being depicted in the input image;
    wherein the selecting comprises is performed when an accuracy of classification of the machine learning model for at least one certain weed parameter is above a threshold;
    wherein the machine learning model comprises a detector component, wherein the test images depict weeds that are of various visual similarities to a ground, the threshold is set to differentiate detection of weeds depicted in the input image that are visually non-similar to the ground and weeds depicted in the input image that are visually similar to the ground.

3. A system for customizing a computing device for dynamic application of herbicides to a target agricultural field, comprising:
    at least one hardware processor executing a code for:
        feeding a plurality of test images corresponding to the target agricultural field into a machine learning model trained on a training dataset of a plurality of sample images of at least one sample agricultural field labelled with ground truth of a plurality of weed parameters;
        selecting at least one specific weed parameter of the plurality of weed parameters according to at least one performance metric of the machine learning model;
        setting up instructions for triggering application of a first herbicide to a portion of the target agricultural field in response to an outcome of the machine learning model indicating likelihood of the at least one specific weed parameter being depicted in an input image of the portion of the target agricultural field; and
    setting up instructions for triggering application of a second herbicide to the portion of the target agricultural field in response to the outcome of the machine learning model indicating non-likelihood of the at least one specific weed parameter being depicted in the input image;

wherein the selecting is performed when an accuracy of classification of the machine learning model for at least one certain weed parameter is above a threshold;

wherein the machine learning model comprises a classifier component, wherein the test images depict weeds that are of various visual similarities to a desired crop, the threshold is set to differentiate classification of weeds that are visually similar to the desired crop from weeds that are visually non-similar to the desired crop.

4. The system of claim 3, wherein setting up instructions for triggering application of the first herbicide comprises setting up instructions for triggering application of the first herbicide using a spot treatment application element designed to apply treatment to a specific spot depicted in the input image, and setting up instructions for triggering application of the second herbicide comprises setting up instructions for triggering application of the second herbicide using a broadcast treatment application element designed to apply treatment using a broadcast approach to a broad region.

5. The system of claim 3, wherein the first herbicide and the second herbicide are liquid chemicals stored in respective containers on an agricultural machine that includes treatment application elements for application to the target agricultural field.

6. The system of claim 3, wherein the second herbicide is further designed to treat weeds having weed parameters of a plurality of species of weeds prior to sprouting from the ground, and/or small weeds less than a size threshold.

7. The system of claim 3,
wherein the machine learning model comprises a detector component that generates an outcome of boxes in response to the input image, each box representing a respective weed having at least one weed parameter depicted therein, the detector component trained on a training dataset of sample images labelled with ground truth sample boxes each depicting a sample weed having at least one weed parameter therein.

8. The system of claim 3, wherein the plurality of weed parameters are selected from a group consisting of: weed species, and growth stage.

9. The system of claim 3, wherein the training dataset includes the plurality of sample images of the at least one agricultural field further labelled with ground truth of a plurality of field parameters of the corresponding sample agricultural field, and the plurality of test images are fed into the machine learning model with at least one field parameter of the target agricultural field.

10. The system of claim 9, wherein the plurality of field parameters are selected from a group consisting of: geographical location, season, phase during an agricultural growth cycle, soil type, whether soil is tilled, whether soil is untitled, weather, and desired crop being grown.

11. The system of claim 3, wherein the at least one hardware processor further executes a code for:
in a plurality of iterations, while maneuvering over a plurality of portions of the target agricultural field, for each respective portion of the target agricultural field:
accessing a respective input image depicting the respective portion of the target agricultural field, the respective input image captured by an imaging sensor located on an agricultural machine;
feeding the respective input image into the machine learning model;
analyzing an outcome of the machine learning model to determine likelihood of the at least one specific weed parameter being depicted in the respective input image;

in response to the at least one specific weed parameter likely being depicted in the respective input image, instructing application of the first herbicide to the respective portion of the target agricultural field depicted in the input image; and
in response to the at least one specific weed parameter non-likely being depicted in the respective input image, instructing application of the second herbicide to the respective portion of the target agricultural field depicted in the input image.

12. The system of claim 11, wherein the agricultural machine is connected to a spray boom, wherein at least one treatment application element for application of the first herbicide and the second herbicide and, the imaging sensor are connected to the spray boom.

13. The system of claim 3, wherein the second herbicide is a broad herbicide selected for treating weeds having a subset of the plurality of weed parameters that exclude the at least one specific weed parameter.

14. The system of claim 3, wherein the first herbicide comprises a specific herbicide selected for treating weeds having the at least one specific weed parameter.

15. The system of claim 3, wherein the test images are captured by an imaging sensor at a resolution corresponding to a target resolution of a target imaging sensor that captures the input image.

16. The system of claim 3, wherein a set of weed parameters of the plurality of weed parameters are designated as non-specific weed parameters when the accuracy of classification of the machine learning model is below the threshold.

17. A system for customizing a computing device for dynamic application of herbicides to a target agricultural field, comprising:
at least one hardware processor executing a code for:
feeding a plurality of test images corresponding to the target agricultural field into a machine learning model trained on a training dataset of a plurality of sample images of at least one sample agricultural field labelled with ground truth of a plurality of weed parameters;
selecting at least one specific weed parameter of the plurality of weed parameters according to at least one performance metric of the machine learning model;
setting up instructions for triggering application of a first herbicide to a portion of the target agricultural field in response to an outcome of the machine learning model indicating likelihood of the at least one specific weed parameter being depicted in an input image of the portion of the target agricultural field; and
setting up instructions for triggering application of a second herbicide to the portion of the target agricultural field in response to the outcome of the machine learning model indicating non-likelihood of the at least one specific weed parameter being depicted in the input image;
wherein the machine learning model comprises a classifier component that generates an outcome of probability of the at least one weed parameter being depicted in the image, the classifier component trained on a training dataset of sample images tagged with a ground truth label indicating presence or absence of sample weeds having weed parameters depicted therein.

18. A system for customizing a computing device for dynamic application of herbicides to a target agricultural field, comprising:
- at least one hardware processor executing a code for:
  - feeding a plurality of test images corresponding to the target agricultural field into a machine learning model trained on a training dataset of a plurality of sample images of at least one sample agricultural field labelled with ground truth of a plurality of weed parameters;
  - selecting at least one specific weed parameter of the plurality of weed parameters according to at least one performance metric of the machine learning model;
  - setting up instructions for triggering application of a first herbicide to a portion of the target agricultural field in response to an outcome of the machine learning model indicating likelihood of the at least one specific weed parameter being depicted in an input image of the portion of the target agricultural field; and
- setting up instructions for triggering application of a second herbicide to the portion of the target agricultural field in response to the outcome of the machine learning model indicating non-likelihood of the at least one specific weed parameter being depicted in the input image;
- wherein the machine learning model is implemented as:
- a detector component trained on a training dataset of images annotated with ground truth boundaries indicating respective objects associated with respective weed parameters, is fed an input image, for generating an outcome of a plurality of bounding boxes, each respective bounding box is associated with a respective first probability value indicating likelihood of a respective weed parameter(s) being depicted in the respective box,
- for a first subset of bounding boxes associated with the respective first probability values less than a first threshold, respective patches corresponding to the subset are extracted from the image,
- wherein a second subset of bounding boxes are associated with respective first probability values greater than the first threshold;
- the extracted respective patches are fed into a classifier component trained on a training dataset of patches extracted from images labelled with ground truth labels indicating respective weed parameters, for obtaining a second probability value indicating likelihood of a respective weed parameter(s) being depicted in the respective patch,
- selecting a third subset of bounding boxes from the first subset according to respective second probability value greater than the first threshold;
- clustering the second subset and the third subset according to respective weed parameter(s); and
- computing a respective third probability value for each weed parameter of each cluster, wherein the respective third probability denoted likelihood of the at least one specific weed parameter being depicted in an input image of the portion of the target agricultural field used to trigger the instructions for application of the first herbicide or the second herbicide.

19. A method for customizing a computing device for dynamic application of herbicides to a target agricultural field, comprising:
- feeding a plurality of test images corresponding to the target agricultural field into a machine learning model trained on a training dataset of a plurality of sample images of at least one agricultural field labelled with ground truth of a plurality of weed types;
- selecting at least one specific weed type of the plurality of weed types according to at least one performance metric of the machine learning model;
- setting up instructions for triggering application of a specific herbicide to a portion of the target agricultural field in response to an outcome of the machine learning model indicating likelihood of the at least one specific weed type being depicted in an input image of the portion of the target agricultural field; and
- setting up instructions for triggering application of a non-specific herbicide to the portion of the target agricultural field in response to the outcome of the machine learning model indicating non-likelihood of the at least one specific weed type being depicted in the input image;
- wherein the selecting is performed when an accuracy of classification of the machine learning model for at least one certain weed parameter is above a threshold;
- wherein the machine learning model comprises a classifier component, wherein the test images depict weeds that are of various visual similarities to a desired crop, the threshold is set to differentiate classification of weeds that are visually similar to the desired crop from weeds that are visually non-similar to the desired crop.

20. A system for customized dynamic application of herbicides to a target agricultural field, comprising:
- at least one hardware processor executing a code for:
  - in a plurality of iterations, while maneuvering over a plurality of portions of the target agricultural field, for each respective portion of the target agricultural field:
    - accessing a respective input image depicting the respective portion of the target agricultural field, the respective input image captured by an imaging sensor located on an agricultural machine;
    - feeding the respective input image into a machine learning model;
    - analyzing an outcome of the machine learning model to determine likelihood of at least one specific weed parameter being depicted in the respective input image;
    - in response to the at least one specific weed parameter likely being depicted in the respective input image, instructing application of a first herbicide to the respective portion of the target agricultural field depicted in the input image; and
    - in response to the at least one specific weed parameter non-likely being depicted in the respective input image, instructing application of a second herbicide to the respective portion of the target agricultural field depicted in the input image,
  - wherein the at least one specific weed parameter is selected from a plurality of weed parameters according to at least one performance metric of the machine learning model fed a plurality of test images corresponding to the target agricultural field into a machine learning model trained on a training dataset of a plurality of sample images of at least one sample agricultural field labelled with ground truth of a plurality of weed parameters;
  - wherein the selecting is performed when an accuracy of classification of the machine learning model for at least one certain weed parameter is above a threshold;

wherein the machine learning model comprises a classifier component, wherein the test images depict weeds that are of various visual similarities to a desired crop, the threshold is set to differentiate classification of weeds that are visually similar to the desired crop from weeds that are visually non-similar to the desired crop.

* * * * *